(12) United States Patent
Ghosh et al.

(10) Patent No.: US 9,517,943 B2
(45) Date of Patent: Dec. 13, 2016

(54) INTEGRATED PROCESS OF PRODUCTION OF POTASSIUM SULPHATE AND AMMONIUM SULFATE FROM KAINITE MIXED SALT

(71) Applicant: Council of Scientific and Industrial Research, New Delhi (IN)

(72) Inventors: Pushpito Kumar Ghosh, Gujrat (IN); Pratyush Maiti, Gujrat (IN); Maheshkumar Ramniklal Gandhi, Gujrat (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 1 day.

(21) Appl. No.: 14/424,938

(22) PCT Filed: Sep. 2, 2013

(86) PCT No.: PCT/IB2013/058216
§ 371 (c)(1),
(2) Date: Feb. 27, 2015

(87) PCT Pub. No.: WO2014/033687
PCT Pub. Date: Mar. 6, 2014

(65) Prior Publication Data
US 2015/0225250 A1      Aug. 13, 2015

(30) Foreign Application Priority Data

Sep. 2, 2012 (IN) .............. 600/DEL/2012

(51) Int. Cl.
C01C 1/24  (2006.01)
C01D 5/00  (2006.01)
C01D 3/04  (2006.01)

(52) U.S. Cl.
CPC . *C01D 5/00* (2013.01); *C01C 1/24* (2013.01); *C01D 3/04* (2013.01); *Y02P 20/125* (2015.11)

(58) Field of Classification Search
CPC .............. C01D 5/00; C01D 5/08; C01C 1/24; C01C 1/244
See application file for complete search history.

(56) References Cited

U.S. PATENT DOCUMENTS 2,895,794 A * 7/1959 Dancy ................... C01D 5/00
                                                            423/196
6,776,972 B2   8/2004 Vohra et al.
(Continued)

FOREIGN PATENT DOCUMENTS

DE          21 03 810 A1    3/1972
WO     WO 2010/109492 A1    9/2010

OTHER PUBLICATIONS

International Search Report and Written Opinion mailed Feb. 13, 2014 in Application No. PCT/IB2013/058216.
(Continued)

*Primary Examiner* — Timothy Vanoy
(74) *Attorney, Agent, or Firm* — Knobbe, Martens, Olson & Bear, LLP

(57) ABSTRACT

The present invention provides an integrated process for the recovery of sulphate of potash (SOP) and ammonium sulphate fertilizers from kainite mixed salt dispensing with magnesium hydroxide production. The process comprises, among other steps, producing calcium chloride from calcium carbonate through addition of hydrochloric acid; the calcium chloride being used for desulphatation of schoenite end liquor (SEL) obtained as liquid stream during decomposition of kainite mixed salt with water to obtain solid schoenite; using the resultant gypsum and carbon dioxide together with ammonia for the production of ammonium sulphate liquor and solid calcium carbonate, the latter being
(Continued)

recycled in the process; producing carnallite from desulphated SEL; decomposing the carnallite to recover carnallite decomposed product (CDP) which is further refined under ambient conditions to obtain pure potassium chloride (KCl) utilized in the preparation of SOP from the schoenite. Except for ammonium sulphate recovery in solid state, where required, all operations are carried out at ambient temperature.

8 Claims, 2 Drawing Sheets

(56) References Cited

U.S. PATENT DOCUMENTS

| | | | |
|---|---|---|---|
| 7,014,832 B2 | 3/2006 | Vohra et al. | |
| 7,041,268 B2 | 5/2006 | Ghosh et al. | |
| 8,182,784 B2* | 5/2012 | Paul | C01D 5/00 23/302 R |
| 8,721,999 B2* | 5/2014 | Ghosh | C01C 1/24 423/158 |
| 2005/0220698 A1* | 10/2005 | Ghosh | C01D 5/00 423/552 |
| 2010/0266482 A1* | 10/2010 | Paul | C01D 5/00 423/552 |

OTHER PUBLICATIONS

Kemp et al., "Calcium Chloride—Ullmann's Encyclopedia of Industrial Chemistry", Jun. 15, 2000, Wiley-VCH Verlag GmbH & Co., p. 513.

* cited by examiner

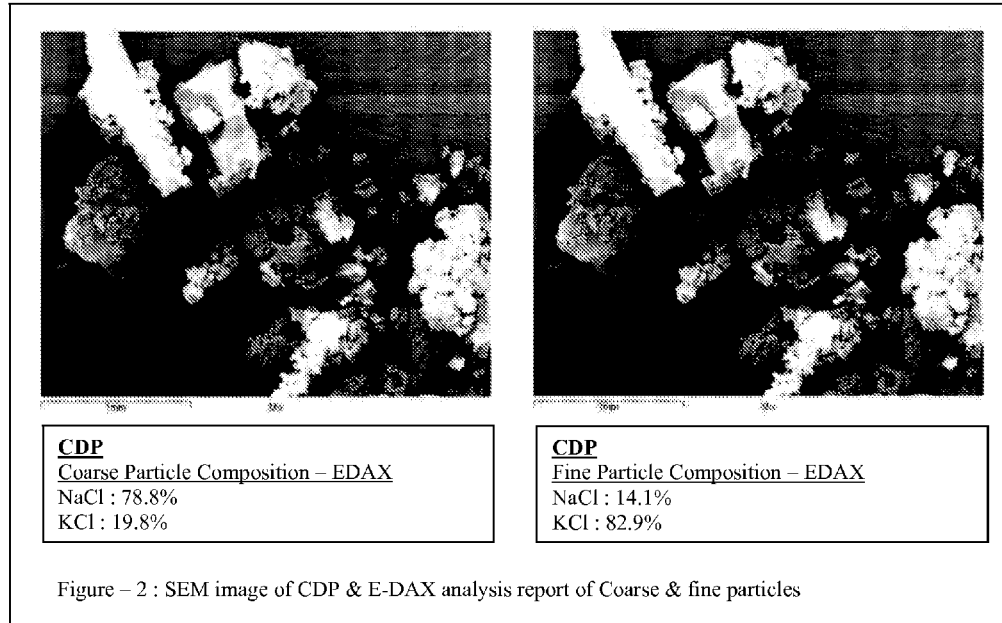
Figure – 2 : SEM image of CDP & E-DAX analysis report of Coarse & fine particles
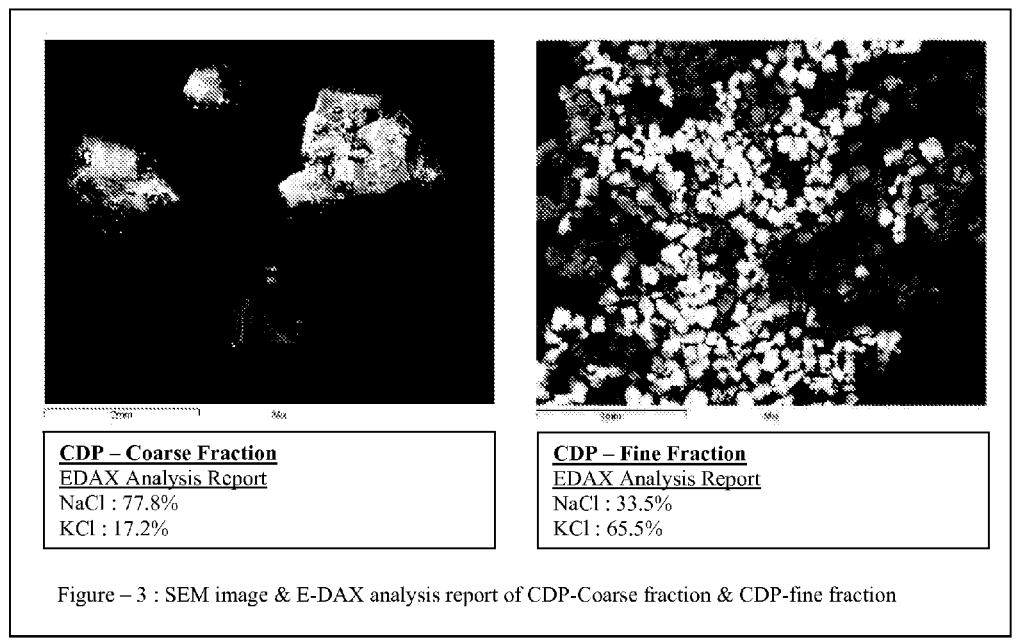
Figure – 3 : SEM image & E-DAX analysis report of CDP-Coarse fraction & CDP-fine fraction

US 9,517,943 B2

INTEGRATED PROCESS OF PRODUCTION OF POTASSIUM SULPHATE AND AMMONIUM SULFATE FROM KAINITE MIXED SALT

FIELD OF THE INVENTION

The present invention provides an integrated process for the production of potassium sulphate (sulphate of potash (SOP)) and ammonium sulphate from kainite mixed salt. Particularly, present invention relates to beneficial synergies and advantages as a result of this specific integration.

BACKGROUND AND PRIOR ART OF THE INVENTION

Kainite mixed salt is obtained from salt bitterns. In pure form it is a double salt of $KCl.MgSO_4.3H_2O$ although as obtained from salt bitterns it typically contains impurities of $NaCl$ and $MgCl_2.6H_2O$.

Potassium sulphate is a dual fertilizer containing 50% $K_2O$ and 18% Sulfur. It has other applications also as documented in the prior art.

Ammonium sulphate is used as dual fertilizer containing 21.5% N and 24.6% S. It is also used as raw material for production of various chemicals.

Reference may be made to U.S. Pat. No. 7,041,268, May 9, 2006 by Ghosh et al. which covers extensively the prior art related to production of potassium sulphate (also referred to as sulphate of potash or SOP) from bittern sources. The process co-generates schoenite and KCl which are then reacted together to obtain SOP. Gypsum and magnesium hydroxide/magnesia are obtained as co-products.

Reference may be made to the same patent above wherein the KCl is obtained from carnallite through decomposition followed by a hot leaching process.

Reference may be made to the paper by Amira et al. (Potash Beneficiation "From Hot to Cold Crystallization", IFA Technical Conference, 1994) wherein it is stated that carnallite may be alternatively subjected to froath floatation to remove excess NaCl and thereafter subjected to decomposition to produce KCl in pure form. The main difficulty with the process is use of organic chemicals required for froth floatation.

Reference may also be made to PCT Publication No WO2010/109492 which teaches the further integration of the above process to obtain ammonium sulphate along with sulphate of potash and magnesium hydroxide/magnesia. The second fertilizer is obtained through the reaction of gypsum with carbon dioxide and ammonia via the Merseberg process to yield ammonium sulphate in solution form and calcium carbonate as precipitate, as taught by the prior art disclosed therein. The calcium carbonate is subsequently re-cycled through its calcinations whereupon the carbon dioxide obtained is utilized in the Merseberg reaction and the lime obtained is utilized in the reaction with magnesium chloride to obtain calcium chloride for desulphatation and magnesium hydroxide as co-product. In this manner, the need for calcium carbonate from external source is dispensed with but the calcium carbonate needs to be of adequate purity to obtain lime of good purity and thus magnesium hydroxide of good purity.

Although the above integration is conceptually ideal, fertilizer companies are typically interested only in fertilizers and may not be interested in the magnesium hydroxide/magnesia component of the product portfolio. Thus a need was felt to devise a process to obtain only sulphate of potash and ammonium sulphate while still ensuring that the process remains viable.

Reference may be made to U.S. Pat. No. 6,776,972 dated Aug. 17, 2004 which discloses the integrated production of pure salt along with marine chemicals. Herein, the decomposition of limestone with hydrochloric acid is disclosed which process generates calcium chloride required for desulphatation operations. No mention is made therein of any utility of the carbon dioxide co-generated.

Objects of the Invention

The main object of the present invention is to provide an integrated and cost-effective process for production of potassium sulphate (sulphate of potash (SOP)) and ammonium sulphate from kainite mixed salt, ammonia and hydrochloric acid.

Another object of the present invention is to produce the above fertilizers without having to co-produce magnesium hydroxide/magnesia obtained which is otherwise obtained when the prior art of PCT Publication No WO2010/109492 is followed.

Yet another object of the present invention is to follow the broad methodology of U.S. Pat. No. 7,041,268 to produce sulphate of potash.

Yet another object of the present invention is to generate calcium chloride required for desulphatation of schoenite end liquor through the reaction of calcium carbonate and hydrochloric acid, as disclosed in U.S. Pat. No. 6,776,972, instead of through the reaction of lime with magnesium chloride as disclosed in the prior art of U.S. Pat. No. 7,041,268.

Yet another object of the present invention is to produce a high concentration of calcium chloride solution to reduce the evaporation load of schoenite end bittern.

Yet another object of the present invention is to use calcium carbonate generated in the process of the present invention instead of outsourced calcium carbonate practiced in the prior art of U.S. Pat. No. 6,776,972.

Yet another object of the present invention is to generate calcium carbonate from the gypsum obtained upon desulphatation of schoenite end liquor (SEL).

Yet another object of the present invention is to produce such calcium carbonate by the well known Merseberg process and thereby obtain ammonium sulphate as a second fertilizer.

Yet another object of the present invention is to utilize carbon dioxide generated from the reaction of calcium carbonate with hydrochloric acid as a raw material for the Merseberg process.

Yet another object of the present invention is to generate carbon dioxide at higher than atmospheric pressure during the reaction of calcium carbonate with hydrochloric acid for its effective utilization in the Merseberg process without much external energy input.

Yet another object of the present invention is to carry out the core operations under ambient temperature conditions.

Yet another object of the present invention is to minimize the use of fresh water which is a scare commodity in many of the locations where such processes would be normally practiced.

Yet another object of the present invention is to minimize waste generation.

BRIEF DESCRIPTION OF THE INVENTION

FIG. 2 represents SEM image of CDP & E-DAX analysis report of Coarse & fine particles.

FIG. 3 represents SEM image & E-DAX analysis report of CDP-Coarse fraction & CDP-fine fraction.

SUMMARY OF THE INVENTION

Figure 1:
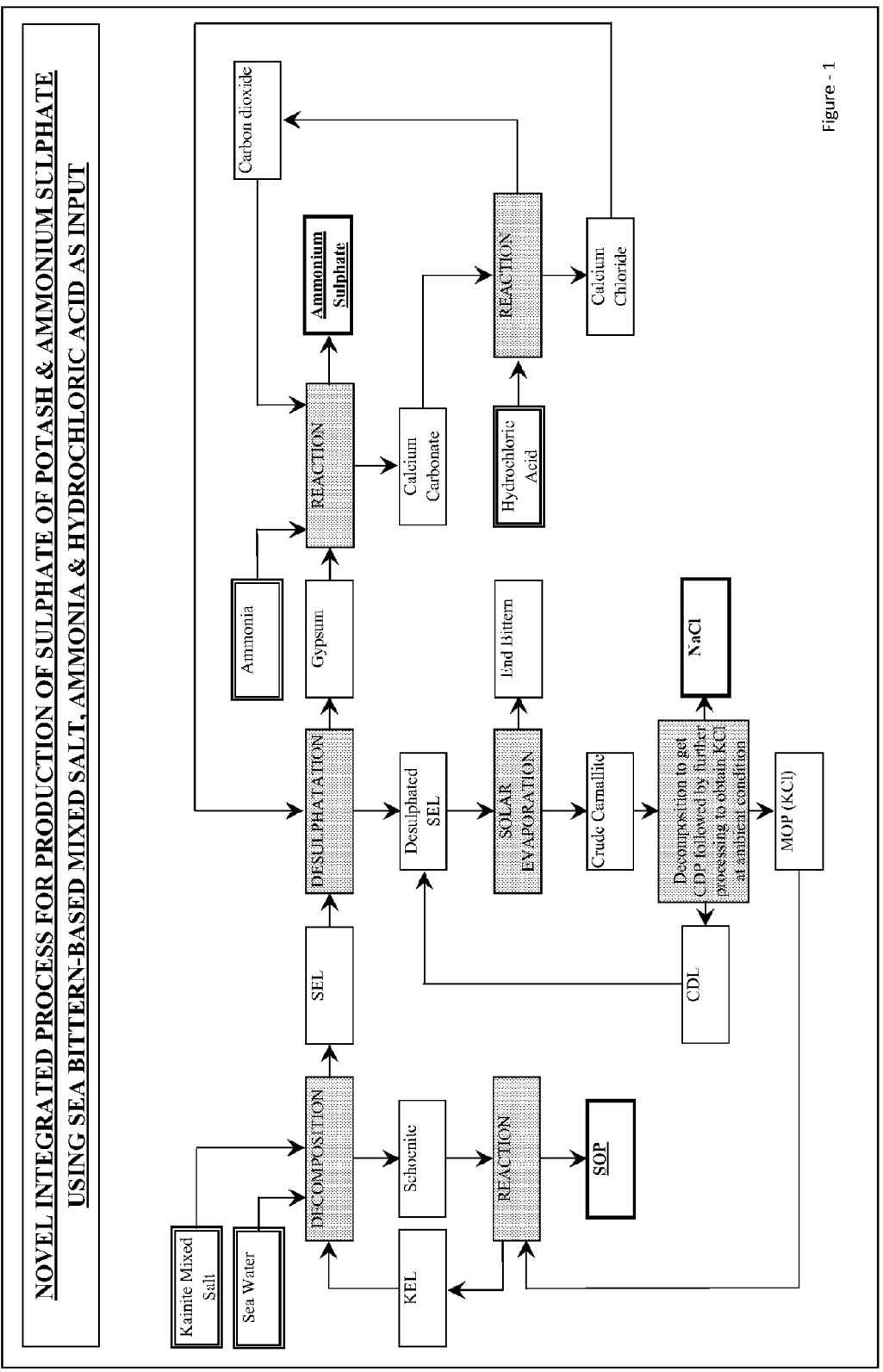
FIG. 1 represents schematic representation of integrated process of production of potassium sulphate (SOP) and ammonium sulfate using sea bittern based mixed salt, ammonia and hydrochloric acid as input.

Accordingly, present invention provides an integrated process for the production of potassium sulphate and ammonium sulfate from kainite mixed salt dispensing with magnesium hydroxide production and the said process comprising the steps of:
  i. adding hydrochloric acid in calcium carbonate to produce 30-40% w/v concentrated calcium chloride and pressurised carbon dioxide ($CO_2$);
  ii. decomposing kainite mixed salt with water to obtain solid schoenite and schoenite end liquor (SEL) as liquid stream as provided in U.S. Pat. No. 7,041,268;
  iii. desulphatising schoenite end liquor (SEL) as obtained in step (ii) using calcium chloride as obtained in step (i) to produce desulphated SEL and Gypsum as provided in U.S. Pat. No. 7,041,268;
  iv. subjecting gypsum as obtained in step (iii) and pressurised carbon dioxide as released in step (i) together with ammonia for the production of ammonium sulphate liquor and solid calcium carbonate, the latter being recycled in step (i);
  v. producing carnallite from desulphated SEL as obtained in step (iii), decomposing the carnallite to obtain carnallite decomposed product (CDP) along with carnallite decomposed liquor (CDL), as provided in U.S. Pat. No. 7,041,268, the later being recycled in desulphated SEL;
  vi. wet sieving of the CDP as obtained in step (v) followed by aqueous leaching of fines fraction, obtained upon wet sieving, to obtain potassium chloride (KCl) (purity >98%);
  vii. utilising the potassium chloride, as obtained in step (vi) in the preparation of SOP from the schoenite as obtained in step (ii), as provided in U.S. Pat. No. 7,041,268.

In an embodiment of the present invention, $CO_2$ gas generated in step (i) was auto-pressurised to 2 $kg/cm^2_g$ without additional energy input, such auto generated pressure being adequate for the purpose of the subsequent Merseberg reaction.

In another embodiment of the present invention, CDP was refined initially by wet sieving drawing on observed differences in the sizes of NaCl and KCl, respectively, the former crystals being significantly larger.

In yet another embodiment of the present invention, KCl separated out through wet sieving was further refined through aqueous leaching of residual NaCl.

In yet another embodiment of the present invention, CDL as obtained in step (vi) is recycled back in step (v) of claim 1 to minimise KCl loss.

In yet another embodiment of the present invention, all the steps related to recovery of KCl from desulphated SEL (steps (v) & (vi)) are carried out under ambient temperature, the range being 26-30° C.

In yet another embodiment of the present invention, the reduction of water evaporation load from desulphated SEL for production of Carnallite on account of higher concentration of $CaCl_2$ used and recovery of KCl in pure form from CDP in this manner is more energy efficient than the conventional hot leaching process.

DETAIL DESCRIPTION OF THE INVENTION

The present invention provides an integrated process for the recovery of Potassium Sulphate (Sulphate of Potash (SOP)) and ammonium sulphate fertilizers from kainite mixed salt dispensing with magnesium hydroxide production as per the scheme of FIG. 1. The said process comprises, among other steps, the following:
  (i) production of calcium chloride from calcium carbonate through addition of hydrochloric acid;
  (ii) decomposition of kainite mixed salt with water to obtain solid schoenite and schoenite end liquor (SEL) as liquid stream;
  (iii) the calcium chloride, from step (i), being used for desulphatation of schoenite end liquor (SEL) as obtained in step (ii) to produce desulphated SEL and Gypsum;
  (iv) using the resultant gypsum from step (iii) and carbon dioxide released in step (i) together with ammonia for the production of ammonium sulphate liquor and solid calcium carbonate, the latter being recycled in step (i);
  (v) producing carnallite from desulphated SEL obtained in step (iii), decomposing the carnallite to recover carnallite decomposed product (CDP) which is further refined under ambient conditions to obtain pure potassium chloride (KCl) utilised in the preparation of SOP from the schoenite obtained in step (ii).
  (vi) Carnallite decomposed liquor (CDL) is recycled back in desulphated SEL.

In the above process, ambient temperature varied from 26-30° C.

Mixture of NaCl & KCl crystals was treated with mixed halogenated solvent (density: 2.08) [prepared by mixing 1 part (v/v) of ethylene dichloride & 9 part (v/v) of ethylene dibromide]. Separation efficiency was more than 98% with commensurate yield.

Carnallite decomposed product (CDP) (solid mixture of KCl and NaCl) was wet sieved & washed with water to produce 99% pure KCl.

Liquor, obtained after washing of finer fraction of wet sieving operation, was recycled back in carnallite decomposition reaction to minimise KCl loss.

$CO_2$ gas, was generated at 2 $kg/cm^2_g$ pressure in the reaction between calcium carbonate & hydrochloric acid.

Inventive Step of the Invention

1. The main inventive step of the present invention is the recognition that fertilizer manufacturers would only want to produce fertilizers and may consider the need to co-generate MgO as per the integrated processes of U.S. Pat. No. 7,041,268 and PCT Publication No WO2010/109492 as a disadvantage.

2. Another inventive step is the identification of an alternative scheme (FIG. 1) which helps dispense with MgO production without sacrificing economic attractiveness;

3. Another inventive step is the derivation of synergy not hitherto disclosed in the prior art, i.e., recycle of both products obtained from the reaction of calcium carbonate with hydrochloric acid;

4. Another inventive step is viewing CDP under the microscope and observing that there is large difference in the sizes of KCl and NaCl crystals.

5. Another inventive step is utilizing the knowledge gained in (4) above to devise a process for the purification of CDP for KCl under ambient conditions.

6. Another inventive step is the natural build up of $CO_2$ pressure during the reaction of calcium carbonate and hydrochloric acid thereby enabling direct discharge of $CO_2$ into the pressurized Merseberg reactor;

7. Another inventive step is minimizing the energy requirement in the process as a result of the inventive steps (5) and (6) above.

8. Another inventive step is the minimization of water consumption in the process by eliminating magnesium hydroxide production.

EXAMPLES

The following examples are given by way of illustration and therefore should not be construed to limit the scope of the present invention.

Comparative Example 500 g of kainite mixed salt, having chemical composition: KCl—17.47%, NaCl—14.84%, $MgSO_4$—31.11%, was treated with 460 mL of sea water & 300 mL of KEL and stirred for 2 hr in a beaker. The slurry was filtered using vacuum filter and yielded 152.0 g of schoenite as solid product, analysing $K_2SO_4$—38.0%, $MgSO_4$—28.2%, and NaCl—1.9%, and 900 mL of filtrate (SEL).

100 g of schoenite was further treated with solution of 40 g of KCl in 200 mL of water under agitation for 3.5 hr. The slurry was filtered to obtain 60 g SOP, analyzing $K_2SO_4$—94.4%, NaCl—1.09%, $MgSO_4$—2.67%, and 240 mL of filtrate (KEL).

Results obtained in this example is similar to the findings disclosed in prior art.

Example 1

Crude carnallite containing 19.7% KCl and 18.3% NaCl was decomposed with water to obtain carnallite decomposed product (CDP) containing 39.4% KCl and 60.3% NaCl (analysis by flame photometry). The CDP was examined through scanning electron microscope (SEM) which revealed that there were crystals of two distinct types, namely large crystals of NaCl and small crystals of KCl, based on SEM analysis coupled with elemental probe (FIG. 2).

Example 2

The CDP of Example 1 was passed through BSS 60 mesh sieve and both the coarse & fine fractions were examined through SEM. The SEM images coupled with elemental probe confirmed that coarse fraction of CDP was mainly NaCl, whereas the fines fraction of CDP was composed of mainly KCl (FIG. 3).

Examples 1 and 2 teach us that there is large difference in the sizes of KCl and NaCl crystals in CDP which can be exploited to separate the constituents.

Example 3

Mixture of 10 gm KCl and 10 gm NaCl was added in 50 ml of mixed halogenated solvent (density: 20.8), prepared by mixing 1 part (v/v) of ethylene dichloride & 9 part (v/v) of ethylene dibromide, under stirring. Particles began to separate when the slurry was allowed to rest. Solid particles floating on the liquid surface were collected & dried. Quantity was found to be 9.9 gm & assay as KCl was <99.5%. Similarly solid particles settled at the bottom were collected & dried. Quantity was found to be 9.8 gm & assay as NaCl was <99.7%.

Example 4

20 gm CDP of example 1 was added in 50 ml of mixed halogenated solvent of example 3, under stirring. On standing, solid particles began to form floc-like agglomerate & no distinct separation pattern was observed.

Examples 3 and 4 teach us that although NaCl & KCl crystals can be separated due to their difference in density, such separation is not feasible for CDP.

Example 5

80 kg of carnallite (KCl: 19.28%, NaCl: 9.93%) was decomposed with 40 L of water. The resultant slurry was subjected to wet sieving through a gyratory siever fitted with BSS 60 mesh screen. The finer fraction (slurry passing through the screen) was centrifuged to obtain 77 L (5.31% KCl) CDL (recycled in step (iv) of Summary of the Invention) and a solid which was washed with 12 L of fresh water to produce 8 kg of KCl (99.12% purity) (used in step (xi) of Summary of the Invention) and 15 L (17.81% KCl) of wash liquor recycled in Example 6 below. Loss of KCl in NaCl fraction was 1.3% with respect to the total KCl input.

Example 6

80 kg of the carnallite (KCl: 19.8%, NaCl: 11.98%) was decomposed with 28 L of water under stirring for 30 min. This was followed by addition of the wash liquor generated in Example 5 and stirring continued for an additional 30 min. The resultant slurry was wet sieved as in Example 5. The finer fraction (slurry passing through the screen) was centrifuged to obtain 73 L (6.3% KCl) CDL which was recycled as in Example 5, and a solid which was washed with 12.2 L of fresh water to produce 9.6 kg of KCl (98.4% purity) (which was utilized in the process as indicated in Example 5) and 14.5 L (14.0% KCl) of wash liquor recycled in subsequent batches. Loss of KCl in NaCl fraction was 1.3% with respect to the total KCl input.

Examples 5 and 6 above teach us the production of pure KCl from carnallite under ambient conditions with recycle of aqueous streams in appropriate steps of the overall process.

Example 7

1 kg calcium carbonate, dispersed in 25 L water, was added in a 30 lit (water fill capacity) stirred reactor, equipped with vent valves & pressure gauge on the top dish. 1.8 L concentrated hydrochloric acid (32% w/v) was added into the reactor by a pump. After completion of addition of acid, all the vent valves were closed & stirring was commenced. Immediately the reactor pressure increased to 2 $kg/cm^2$.

Examples 7 above teaches us the method to build up $CO_2$ pressure during the reaction of calcium carbonate and hydrochloric acid and thereby enabling direct discharge of $CO_2$ into the Merseberg reactor.

Advantages of the Invention

The present invention provides an integrated and cost-effective process for production of sulphate of potash and ammonium sulphate from kainite mixed salt, ammonia and hydrochloric acid.

Main advantages of the present invention may be stated as follows:
i) Avoidance of MgO which fertilizer producers may not be interested in;
ii) The strength of calcium chloride solution obtained from decomposition of calcium carbonate with HCl is much higher which would help avoid unnecessary dilution of the SEL and reduce thereby the burden of evaporation.
iii) Production of KCl from CDP under ambient conditions drastically reduces the energy demand in the process.
iv) Auto-generated $CO_2$ pressure avoids cost of compressing the gas by mechanical means.
v) Reduction

What is claimed is:

1. An integrated process for the production of potassium sulphate and ammonium sulfate from a kainite mixed salt, dispensing with magnesium hydroxide production, the process comprising the steps of:
   i. adding hydrochloric acid in calcium carbonate to produce 30-40% w/v concentrated calcium chloride and pressurized carbon dioxide ($CO_2$);
   ii. decomposing the kainite mixed salt with water to obtain solid schoenite and schoenite end liquor (SEL) as a liquid stream;
   iii. desulphatizing the SEL as obtained in step (ii) using the calcium chloride as obtained in step (i) to produce desulphated SEL and gypsum;
   iv. subjecting the gypsum as obtained in step (iii) and the pressurized $CO_2$ as released in step (i) together with ammonia for the production of ammonium sulphate liquor and solid calcium carbonate, the latter being recycled in step (i);
   v. producing carnallite from the desulphated SEL as obtained in step (iii), decomposing the carnallite to obtain carnallite decomposed product (CDP) along with carnallite decomposed liquor (CDL), the latter being recycled in desulphated SEL;
   vi. wet sieving the CDP as obtained in step (v) followed by aqueous leaching of fines fraction, obtained upon wet sieving, to obtain potassium chloride (KCl) (purity >98%);
   vii. utilizing the potassium chloride, as obtained in step (vi) in the preparation of sulphate of potash (SOP) from the schoenite as obtained in step (ii).

2. The process as claimed in claim 1, wherein the $CO_2$ gas generated in step (i) is auto-pressurized to 2 kg/cm$^2$g without additional energy input, wherein the auto generated pressure is adequate for the purpose of a subsequent Merseberg reaction.

3. The process as claimed in claim 2, wherein the auto-pressurized $CO_2$ is used in a Merseberg reaction.

4. The process as claimed in claim 1, wherein the CDP is refined by wet sieving based on differences in the sizes of NaCl and KCl crystals, respectively, the former being significantly larger.

5. The process as claimed in claim 1, wherein the KCl separated by wet sieving is further refined by aqueous leaching of residual NaCl.

6. The process as claimed in claim 5, wherein the CDL as obtained in step (v) is recycled back in step (v) of claim 1 to minimize KCl loss.

7. The process as claimed in claim 1, wherein the steps related to recovery of the KCl from desulphated SEL, comprising steps (v) & (vi), are carried out under ambient temperature.

8. The process as claimed in claim 7, wherein the ambient temperature range is 26-30° C.

\* \* \* \* \*